April 10, 1951 F. A. MORRIS 2,548,737

MULTIPLEX PHASE GENERATOR

Filed Jan. 11, 1949 5 Sheets-Sheet 1

INVENTOR.
FRANK A. MORRIS
BY T. L. Bowes
ATTORNEY

April 10, 1951 F. A. MORRIS 2,548,737

MULTIPLEX PHASE GENERATOR

Filed Jan. 11, 1949 5 Sheets-Sheet 2

INVENTOR.
FRANK A. MORRIS

BY T. L. Bowes

ATTORNEY

April 10, 1951 F. A. MORRIS 2,548,737

MULTIPLEX PHASE GENERATOR

Filed Jan. 11, 1949 5 Sheets-Sheet 3

INVENTOR.
FRANK A. MORRIS
BY T. L. Bowes
ATTORNEY

INVENTOR.
FRANK A. MORRIS
BY T. L. Bowes
ATTORNEY

April 10, 1951 F. A. MORRIS 2,548,737

MULTIPLEX PHASE GENERATOR

Filed Jan. 11, 1949 5 Sheets-Sheet 5

| SEQUENTIAL PULSE GENERATOR OUTPUT LEADS | MULTIPHASE OUTPUT — CONNECT SEQUENTIAL PULSE LEAD TO SQUARE WAVE GENERATOR TERMINAL INDICATED: 2 PHASE | | 3 PHASE | | 4 PHASE | | 5 PHASE | | 6 PHASE | |
|---|---|---|---|---|---|---|---|---|---|---|
| | ON | OFF | ON | OFF | ON | OFF | ON | OFF | ON | OFF |
| A | PHASE 1 | | PHASE 1 | | PHASE 1 | PHASE 3 | PHASE 1 | | PHASE 1 | PHASE 4 |
| B | | PHASE 1 | | PHASE 3 | | | | PHASE 4 | | |
| C | PHASE 2 | | PHASE 2 | | PHASE 2 | PHASE 4 | PHASE 2 | | PHASE 2 | PHASE 5 |
| D | | PHASE 2 | | PHASE 1 | | | | PHASE 5 | | |
| E | REPEAT → | | PHASE 3 | | PHASE 3 | PHASE 1 | PHASE 3 | | PHASE 3 | PHASE 6 |
| F | | | | PHASE 2 | | | | PHASE 1 | | |
| G | | | REPEAT → | | PHASE 4 | PHASE 2 | PHASE 4 | | PHASE 4 | PHASE 1 |
| H | | | | | REPEAT → | | | PHASE 2 | | |
| I | | | | | | | PHASE 5 | | PHASE 5 | PHASE 2 |
| J | | | | | | | | PHASE 3 | | |
| K | | | | | | | REPEAT → | | PHASE 6 | PHASE 3 |
| L | | | | | | | | | REPEAT → | |

FIG. 5

INVENTOR.
FRANK A. MORRIS
BY T. L. Bowes
ATTORNEY

Patented Apr. 10, 1951

2,548,737

UNITED STATES PATENT OFFICE 2,548,737

MULTIPLEX PHASE GENERATOR

Frank A. Morris, Rochester, N. Y., assignor to Stromberg-Carlson Company, a corporation of New York Application January 11, 1949, Serial No. 70,250

9 Claims. (Cl. 250—36)

This invention relates to multiplex phase generators.

It is an object of my invention to provide a new and improved multiphase generator in which the phase relationships and the waveform are substantially independent of substantial changes in the frequency of the source of supply from which the multiphase output is obtained.

In the preferred embodiment of my invention, there is provided a source of supply which may comprise a pulse generator which, in turn, may be driven from a master oscillator. The pulse generator includes a plurality of outputs, the number of output terminals usually being double the number of phases desired to be developed. A pulse generator may comprise a suitable ring circuit. Each output is connected to means such as a square wave generator of the Eccles-Jordan type for developing a step function. The output of each square wave generator, displaced with respect to the other outputs, is filtered or smoothed to a sine wave.

The pulse repetition rate, i. e., the frequency of the source of supply, is preferably twice the number of phases desired to be developed or generated multiplied by the desired phase frequency. For example, if it is desired to develop a three-phase supply at 8 kilocycles, the pulse rate or oscillator frequency should be $2\times3\times8$ or 48 kilocycles.

As the ring advances from stage to stage, it triggers the square wave generators successively to an "on" condition for half a cycle and then successively trips them to an "off" condition for the next half cycle. The resulting outputs are properly displaced with respect to each other. These outputs are then converted to sine waves by means of low pass filters. I have found that if the cut-off frequency of the filter is set as much as one and one-half times the desired frequency, the driving frequency may wander for nearly a full octave without affecting either the phase relationships of the outputs or the waveform developed.

Figure 2:
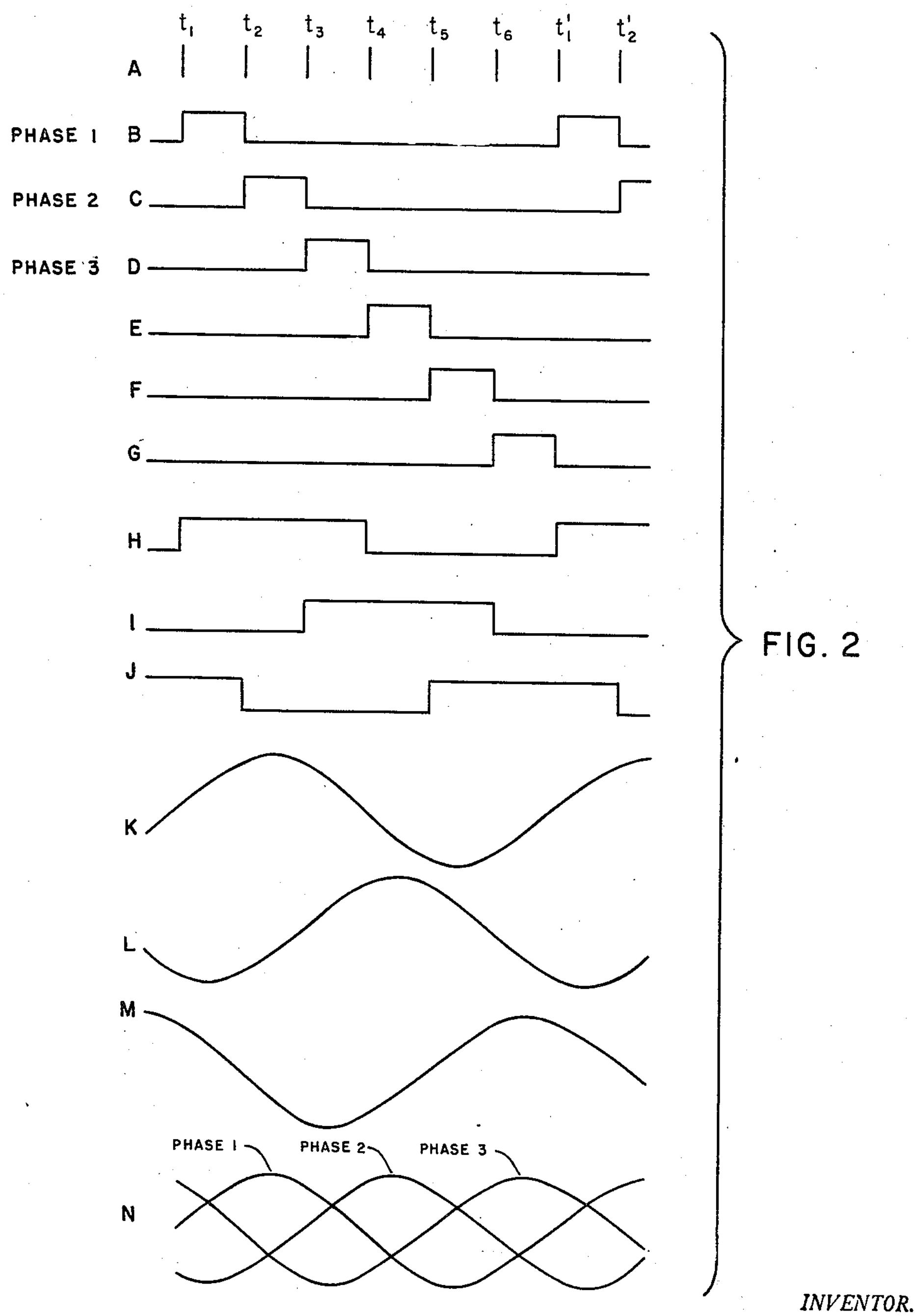
Figure 3:
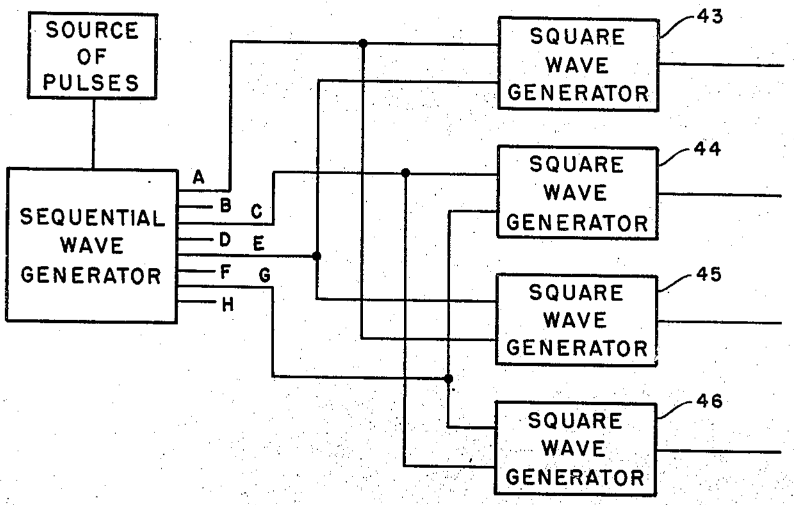
Figure 6:
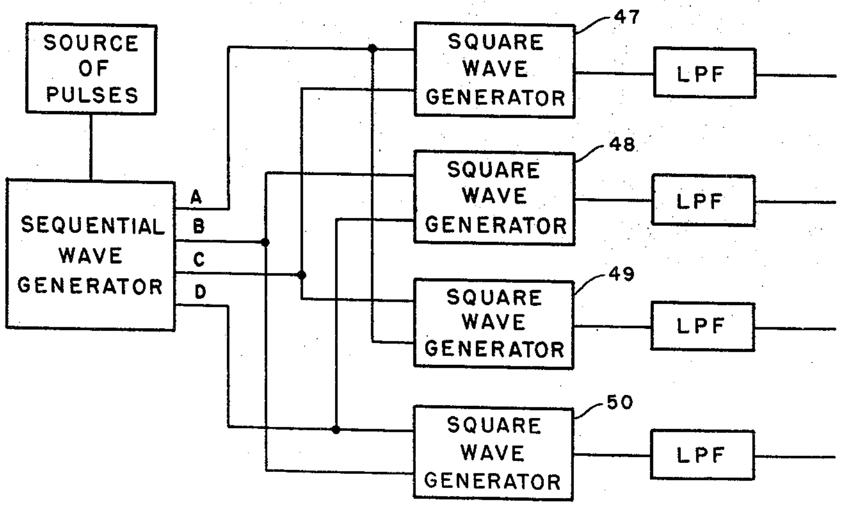
Figure 4:
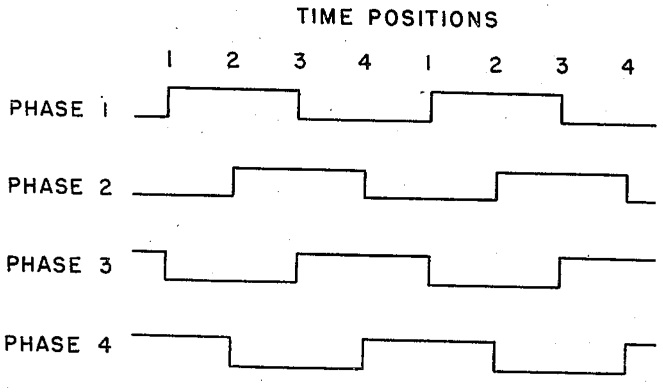
Figure 7:
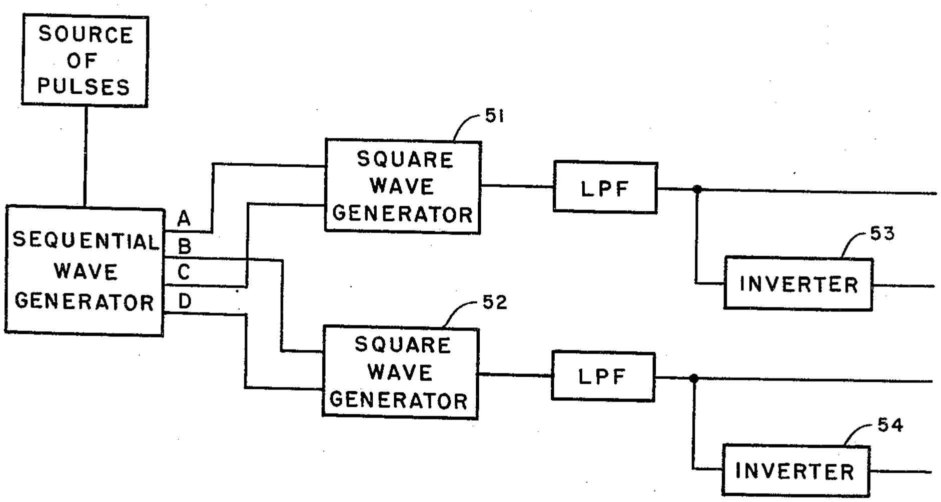

The features of my invention which I believe to be novel are set forth with particularity in the appended claims. My invention itself, both as to its organization and manner of operation, together with further objects and advantages thereof, may best be understood by reference to the following description taken in connection with the accompanying drawings in which Fig. 1 is a schematic diagram illustrating one embodiment of my invention, Fig. 2 is a chart illustrating the operation of the circuit shown in Fig. 1, Fig. 3 shows a second embodiment of my invention, Fig. 4 illustrates certain operations of the circuit of Fig. 3, Fig. 5 is a chart useful in practising my invention and Figs. 6 and 7 represent modifications of Fig. 3.

Figure 1:
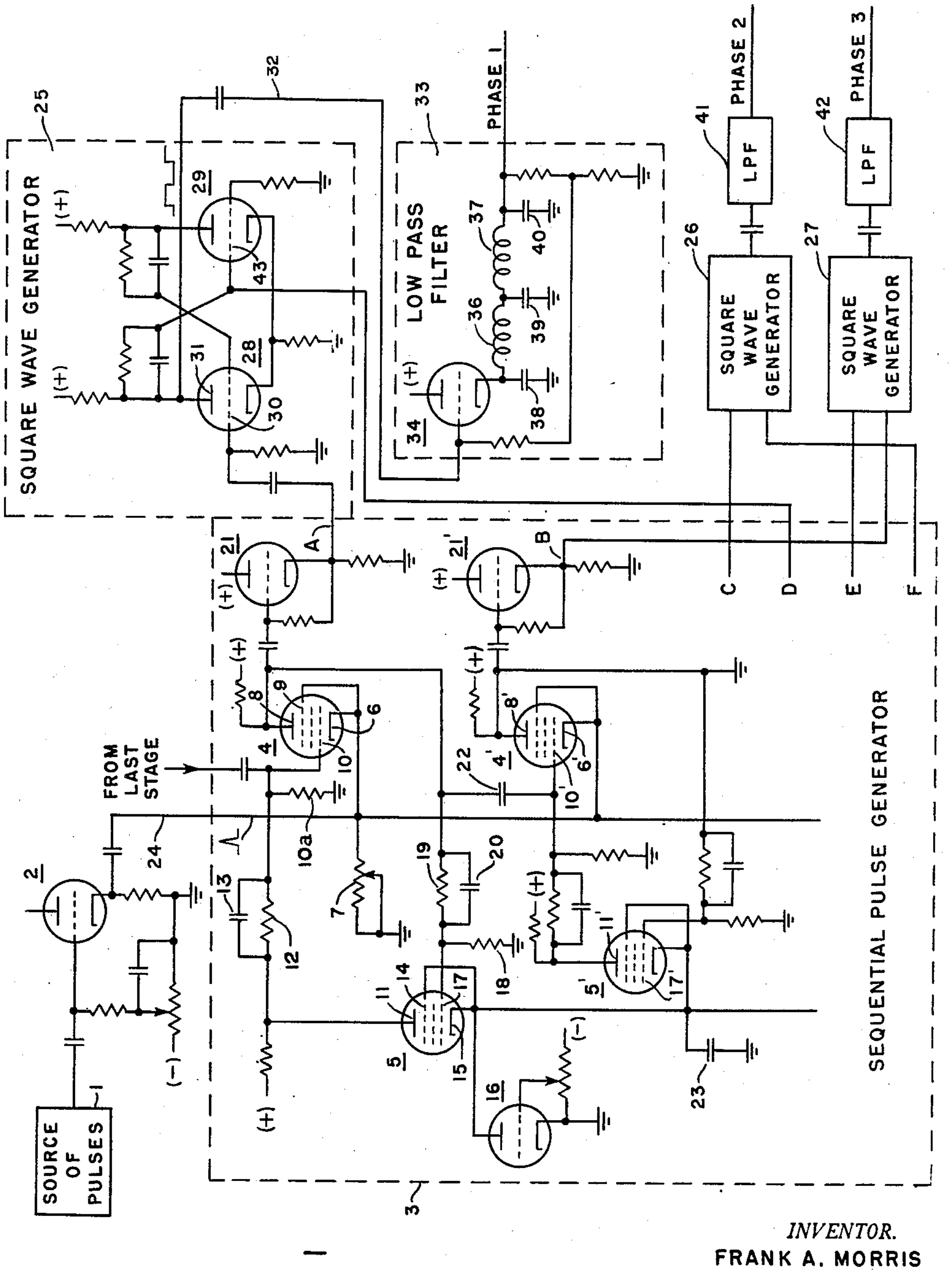

Referring to Fig. 1 of the drawings, there is shown a source 1 of recurring equally-spaced pulses which may be a blocking oscillator or a master oscillator driving any suitable pulse forming circuit. The incoming pulses are suitably amplified as by means of electron discharge device 2 and applied to the sequential pulse generator indicated by the dashed rectangle 3. The sequential pulse generator, illustrated as being a ring circuit, comprises a plurality of stages, it being preferred that there be twice as many stages as phases to be developed or generated. In Fig. 1 there are illustrated the necessary components to provide a three-phase output. Accordingly, there are required six stages in the sequential pulse generator, of which two stages are shown.

Each stage comprises a pair of electron discharge devices and an output and impedance matching device. Referring to Fig. 1, the first stage comprises suitable electron discharge devices 4 and 5, illustrated as being of the pentode type. The right hand discharge device or output element 4 of the first stage comprises a cathode 6 connected to ground through a suitable resistor 7 and an anode 8 connected to a suitable source of positive potential. The suppressor element or grid 9 is connected to cathode 6, control electrode or grid 10 is connected to the output of the last stage, to ground through a suitable resistor 10*a*, and also to the anode 11 of discharge device 5 through a suitable feedback circuit including resistor 12 and capacitor 13. Suppressor electrode 14 and cathode 15 of discharge device 5 are connected to ground through a suitable switching device such as electron discharge device 16. Control electrode 17 of discharge device 5 is connected to ground through a suitable resistor 18 and also to the anode 8 of discharge device 4 through a suitable filter element comprising resistor 19 and capacitor 20. To provide an output, anode 8 of discharge device 4 is suitably coupled to cathode follower stage 21. The output of cathode follower 21 is applied to the output terminal or conductor A.

The second stage of the ring is connected in the same manner as the first stage and the comparable parts are indicated by the same numerals as used in connection with stage 1 except that the numerals are primed. Anode 8 of discharge device 4 is connected through a suitable coupling capacitor 22 to the control electrode 10′ of the second stage. Cathode 6' is connected to cathode 6 of discharge device 4 and to all the other cathodes of the right hand elements 4, 4', etc., of each stage. Similarly, the cathodes of all the left hand tubes, 5, 5', etc., are connected together and to ground through a suitable bypass capacitor 23. The output of cathode follower stage 21' is connected to output terminal or conductor B. The other output terminals or conductors are indicated by the letters C, D, E and F.

The operation of the sequential pulse generator is as follows: Positive pulses are applied to the cathodes of all the output elements 4, 4', etc., of the sequential pulse generator. With the connection shown either discharge device 4 or discharge device 5 may be conducting, the other being non-conducting. Furthermore, with the connection shown there will be only one of the tubes or discharge devices 4, 4', etc., in a conducting condition. Thus, let it be assumed that discharge device 4 is conducting. Under this condition, discharge device 5 is non-conducting and the other right hand stage elements 4', etc., are non-conducting and the left hand elements 5', etc., are conducting. The presence of a positive pulse on cathode 6 of discharge device 4 causes discharge device 4 to be rendered non-conductive. The resulting increase in anode potential is applied to grid or control electrode 17 of discharge device 5 causing that tube to be conductive. The increase in anode potential is also applied to control electrode or grid 10' of discharge device 4' in the second stage causing electron discharge device 4' to be rendered conductive. The resulting decrease in anode potential at anode 8' of discharge device 4' is applied to control electrode 17' of discharge device 5', thereby rendering non-conductive discharge device 5'. The ring circuit is stable in the new condition until the appearance of the next pulse which will cut off discharge device 4' and fire discharge device 5', so that the ring moves forward one stage for each trigger or control pulse received.

As soon as discharge device 5 becomes conductive, the potential at anode 11 decreases and this lowered potential is applied to control electrode 10 of discharge device 4, thereby tending to hold discharge device 4 non-conductive. Similarly, the higher potential existing at anode 11' of discharge device 5' after discharge device 5' is cut off is coupled back to control electrode 10' of discharge device 4', thereby tending to hold discharge device 4' conductive. Thus, the use of the left hand tubes designated by the numerals 5, 5', etc., tends to insure accurate operation of the ring and to give sharp leading and trailing edges to the output pulses from the sequential pulse generator.

There is provided means for producing a step function or wave for each phase to be developed. In the arrangement shown in Fig. 1, there are provided three square-wave generators 25, 26 and 27 of the Eccles-Jordan type arranged to remain in one or the other of two conditions until triggered to the complementary condition. Each square wave generator comprises electron discharge devices 28 and 29 connected in a well-known manner. It is believed sufficient to point out in this description that the sequential pulses appearing on conductor A are applied to the control electrode or grid 30 of discharge device 28 and the resulting square wave pulses appearing on the anode 31 of discharge device 28 constitute the output of the square wave generator 25. If it be assumed that electron discharge device 28 is non-conductive, electron discharge device 29 is conductive. Under these conditions, an increase of potential on conductor A in the positive direction renders discharge device 28 conductive and discharge device 29 non-conductive. The more-negative potential now existing at anode 31 of discharge device 28 appears on output conductor 32 and is applied to low-pass filter 33.

In the illustrated embodiment of my invention, the low pass filter unit 33 comprises an electron discharge device 34 and a plurality of filter elements connected in the anode-to-cathode circuit of discharge device 34. The filter elements comprise series inductances 36 and 37 and shunt capacitors 38, 39 and 40. The output of low pass filter 33 provides the waveform for one of the three phases and it will be understood that the flow of current through the filter varies with the potential at the grid of discharge device 34 and operates to smooth the step function to a sine wave.

Similar low pass filters 41 and 42 are provided to smooth the outputs of square wave generators 26 and 27 and provide the waveforms for phases 2 and 3.

Reference to Fig. 1 brings out the first, third and fifth stages, represented by conductors A, C, and E, constitute the triggering or "on" leads upon which appear the pulses necessary to trigger "on" the output tube in the respective square wave generator. Means is provided for restoring each of the square wave generators to its other condition. For this purpose the alternate, i. e., second, fourth and sixth stages are employed to trigger "off" the square wave generators by applying pulses to the control electrode 43 of the reset elements such as discharge device 29, in each of the square wave generators. Thus, again referring to Fig. 1, the fourth, sixth and second stages, indicated by the letters D, F and B, are employed to trigger "off" or to reset the square wave generators 25, 26 and 27, respectively.

Fig. 2 is useful in understanding the operation of the components illustrated in Fig. 1. At Fig. 2A there is illustrated a train of recurring equally spaced-apart driving pulses appearing at times $t_1$, $t_2$, . . . $t'_2$. Figs. 2B to 2G, inclusive, illustrate the sequential pulses appearing on the output conductors A, B, C, D, E and F, respectively. Thus, at time $t_1$ a pulse is produced by stage 1, appearing on lead A. At time $t_2$ the pulse on conductor A is terminated and a pulse appears on conductor B, etc. Figs. 2, H, I, and J illustrate the outputs of the square wave generators 25, 26 and 27 representing phases 1, 2 and 3, respectively. A positive going potential or pulse appears in the output of square wave generator 25 (phase 1) from time $t_1$ to time $t_4$, a positive going potential or pulse appears in the output of square wave generator 26 (phase 2) from time $t_3$ to time $t_6$, and a positive going potential or pulse appears in the output of square wave generator 27 (phase 3) beginning at time $t_5$ and terminating at time $t'_2$. Figs. 2, K, L and M illustrate the wave forms of the outputs of filters 33, 41 and 42 and Fig. 2N illustrates the combined three-phase output.

The arrangement shown in Figs. 1 and 2 is intended to provide a three-phase output as stated hereinbefore. A similar arrangement is employed for any odd number of desired phases, i. e., the odd numbered stages are used to trigger the square wave generators to the "on" condition and the even numbered stages are employed to trigger the square wave generators to the "off" condition in the same order as the square wave generators were triggered to the "on" condition.

Fig. 3 illustrates an arrangement for developing a four phase output and is indicative of the connections required when an even number of phases is to be developed. It is noted that when an even number of phases is to be developed, the pulses appearing in the output of the even numbered stages of the sequential wave generator are not employed. Referring to Fig. 3 the output leads A, C, E, and G are connected to trigger "on" the square wave generators 43, 44, 45 and 46 in the proper relationship, and conductors E, G, A, and C are connected in that order to trigger "off" square wave generators 43, 44, 45, and 46, respectively.

It is further noted that in all cases the odd numbered outputs or stages of the sequential pulse generators are employed to trigger "on" the proper square wave generators and that either the odd or even numbered output stages are utilized to provide the "off" pulses, depending upon whether it is desired to develop an even or an odd number of phases.

This relationship is brought out in Fig. 5 which comprises a table illustrating the foregoing conditions. In the left hand vertical column are indicated the output leads of the sequential pulse generator. There are displayed to the right of the first column five additional columns representing connections to give two phase, three phase, four phase, five phase, and six phase outputs. Within each of these five columns are two sub-columns, one designating the sequential generator outputs required to trigger "on" the various phases and the other the generator output leads require to trigger "off" the square wave generators. For example. if a three-phase output is required, reference to the third column indicate that phases 1, 2 and 3 are operated to the "on" condition by the pulses appearing on sequential generator leads or conductors A, C, and E and the square wave generators representing phases 1, 2 and 3 are connected to sequential generator conductors D, F, and B, respectively.

While there has been illustrated the preferred embodiment of my invention, other modifications are within the scope of my invention. For example, instead of employing square wave generators, simple resonant circuits may be shock excited by the stages of the ring or sequential pulse generator in which case it is necessary to reverse the polarity of the negative cycle excitation pulses. This arrangement is inferior to the preferred embodiment of my invention in that the power output of the circuit is relatively small and the driving frequency must be accurately maintained because both waveforms and phases are affected by detuning and variation of tuning of the resonant circuits.

Fig. 4 illustrates a modification wherein an output of an even number of phases is developed. Sequential outputs equal in number to twice the number of phases to be generated are not necessary but only the same number of outlets are required. As indicated in Fig. 4, phases 1 and 3 have an inverse relationship to each other, and similarly, phases 2 and 4 have an inverse relation to each other. Therefore, as illustrated in Fig. 6 sequential pulse generator outputs A, B, C and D may be employed to trigger "on" square wave generators 47, 48, 49 and 50 and sequential pulse leads C, D, A and B may be employed to trigger "off" the square wave generator in the same order in which they were triggered "on."

In Fig. 7, there is shown still another modification which may be employed to provide an output of an even number of phases. With this arrangement, conductors A and B are connected to provide "on" pulses to square wave generators 51 and 52, respectively, and conductors C and D are connected to provide "off" pulses to generators 51 and 52, respectively. The "off" pulses or the trailing edges thereof are used to operate inverters 53 and 54 to provide the third and fourth phases, the "on" pulses being used to provide the first and third phases.

While I have shown and described a particular embodiment of my invention, it will be obvious to those skilled in the art that changes and modifications may be made without departing from my invention in its broader aspects. I, therefore, aim in the appended claims to cover all such changes and modifications as fall within the true spirit and scope of my invention.

What I claim is:

1. A multiphase generator comprising a source of recurring equally-spaced pulses, a pulse generator having a plurality of outputs, means utilizing said spaced pulses for operating said pulse generator to develop sequential trigger pulses at said outputs, a plurality of square wave generators arranged to remain in one or the other of two conditions, one square wave generator being provided for each phase to be generated, certain of said outputs being connected to trigger sequentially said square wave generators to said one condition, and means utilizing certain of said outputs for sequentially triggering said square wave generators in the same order to said other condition.

2. A multiphase generator comprising a source of recurring equally-spaced pulses, a pulse generator having a plurality of outputs, means utilizing said spaced pulses for operating said pulse generator to develop sequential trigger pulses at said outputs, a plurality of square wave generators arranged to remain in one or the other of two conditions, one square wave generator being provided for each phase to be generated, certain of said outputs being connected to trigger sequentially said square wave generators to said one condition, means utilizing certain of said outputs for sequentially triggering said square wave generators in the same order to said other condition, and means for smoothing the output of each square wave generator.

3. A multiphase generator comprising a source of recurring equally-spaced pulses, a pulse generator having a plurality of outputs, means utilizing said spaced pulses for operating said pulse generator to develop sequential trigger pulses at said outputs, a plurality of square wave generators arranged to remain in one or the other of two conditions, one square wave generator being provided for each phase to be generated, certain of said outputs being connected to trigger sequentially said square wave generators to said one condition, and means utilizing certain of said outputs for sequentially triggering said square wave generators in the same order to said other condition, the repetition rate of said spaced pulses being equal to twice the desired frequency multiplied by the number of phases desired to be generated.

4. A multiphase generator comprising a source of recurring equally-spaced pulses, a pulse generator having a plurality of outputs, there being two outputs for each phase to be generated, means utilizing said spaced pulses for causing trigger pulses to appear sequentially at said outputs, a plurality of square wave generators arranged to remain in one or the other of two conditions until triggered to the other condition, there being one generator for each phase to be generated, one output corresponding to each phase being connected to trigger a square wave generator to one condition whereby said square wave generators are successively triggered to said one condition, and the remaining outputs being connected to trigger said square wave generator to the other of said conditions in the same order as said square wave generators were triggered to said one condition, and low pass filtering means connected to the output of each square wave generator.

5. A multiphase generator comprising a source of recurring equally-spaced pulses, the repetition rate of said spaced pulses being equal to twice the number of phases to be developed multiplied by the frequency desired, a pulse generator having a plurality of outputs, there being two outputs for each phase to be generated, means utilizing said spaced pulses for causing trigger pulses to appear sequentially at said outputs, a plurality of square wave generators arranged to remain in one or the other of two conditions until triggered to the other condition, there being one generator for each phase to be generated, one output corresponding to each phase being connected to trigger a square wave generator to one condition whereby said square wave generators are successively triggered to said one condition, and the remaining outputs being connected to trigger said square wave generator to the other of said conditions in the same order as said square wave generators were triggered to said one condition, and low pass filtering means connected to the output of each square wave generator.

6. A multiphase generator for developing an output having an odd number of phases comprising a source of recurring equally-spaced pulses, a pulse generator having a plurality of outputs, there being two outputs for each phase to be generated, means utilizing said spaced pulses for causing trigger pulses to appear sequentially at said outputs, a plurality of square wave generators arranged to remain in one or the other of two conditions until triggered to the other condition, there being one generator for each phase to be generated, means for connecting the odd numbered stages of said sequential pulse generators to trigger said square wave generators successively to one condition, and means utilizing the even numbered stages of said sequential pulse generator to trigger said square wave generators in the same order to the other condition.

7. A multiphase generator for developing an output having an even number of phases comprising a source of recurring equally-spaced pulses, a pulse generator having a plurality of outputs there being two outputs for each phase to be generated, means utilizing said spaced pulses for causing trigger pulses to appear sequentially at said outputs, a plurality of square wave generators arranged to remain in one or the other of two conditions until triggered to the other condition, there being one generator for each phase to be generated, means connecting the odd numbered stages of said sequential pulse generators to said square wave generator in such a manner as to trigger said square wave generator to one condition, and means utilizing the odd numbered stages of said sequential pulse generator to trigger said square wave generator in the same order to the other condition.

8. A multiphase generator comprising a source of recurring equally-spaced pulses, a pulse generator having a plurality of outputs there being two outputs for each phase to be generated, means utilizing said spaced pulses for causing trigger pulses to appear sequentially at said outputs, a plurality of square wave generators arranged to remain in one or the other of two conditions until triggered to the other condition, there being one generator for each two phases to be generated, means connecting alternate sequential pulse outputs to said square wave generators for triggering said square wave generators successively to one condition, means connecting the remaining outputs to said square wave generators for later triggering said square wave generators successively in the same order to the other condition, whereby each square wave generator provides output voltages for half the desired number of phases, displaced with respect to each other by an amount depending upon the number of phases to be developed, and an inverter connected to the output of each square wave generator whereby each inverter produces two output voltages 180° apart with respect to the first-mentioned output voltages for the remaining desired number of phases.

9. A multiphase generator comprising a source of recurring equally-spaced pulses, a pulse generator having a plurality of output terminals, means utilizing said spaced pulses for operating said pulse generator to develop sequential trigger pulses at said terminals, a plurality of square wave generators arranged to remain in one or the other of two conditions in the absence of a trigger potential, the number of square wave generators being determined by the number of phases to be generated, certain of said terminals being connected to conduct pulses to trigger sequentially said square wave generators to said one condition, and means utilizing certain of said terminals for conducting pulses to trigger sequentially said square wave generators in the same order to said other condition.

FRANK A. MORRIS.

REFERENCES CITED

The following references are of record in the file of this patent:

UNITED STATES PATENTS

| Number | Name | Date |
|---|---|---|
| 2,006,346 | Curtis | July 2, 1935 |
| 2,305,625 | Lauer | Dec. 22, 1942 |
| 2,423,866 | Woodyard | July 15, 1947 |
| 2,472,507 | Andresen, Jr., et al. | June 7, 1949 |